United States Patent [19]

Maingueneau

[11] 4,020,276
[45] Apr. 26, 1977

[54] SEALANT BARRIER FOR ELECTRICAL CABLES

[75] Inventor: Jean-Marie Maingueneau, Brignoud, France

[73] Assignee: SCAL - Societe de Conditionnements en Aluminum, Paris, France

[22] Filed: Mar. 19, 1976

[21] Appl. No.: 668,620

[30] Foreign Application Priority Data

Apr. 11, 1975 France .............................. 75.12410
June 13, 1975 France .............................. 75.19156

[52] U.S. Cl. .......................... 174/23 R; 174/107
[51] Int. Cl.² ........................................ H01B 7/28
[58] Field of Search ........... 174/23 R, 23 C, 102 R, 174/102 D, 107, 120 SC, 120 SR

[56] References Cited

UNITED STATES PATENTS

| | | | |
|---|---|---|---|
| 2,890,263 | 6/1959 | Branoes et al. | 174/102 D X |
| 2,995,616 | 8/1961 | Nicolas | 174/102 D UX |
| 3,394,400 | 7/1968 | Lamons | 174/102 R |
| 3,479,621 | 11/1969 | Martin | 174/102 D UX |
| 3,745,232 | 7/1973 | Johnson et al. | 174/102 D X |
| 3,766,309 | 10/1973 | Calzolari et al. | 174/102 D |
| 3,843,830 | 10/1974 | Priaroggia et al. | 174/102 D |
| 3,943,271 | 3/1976 | Bahder | 174/102 D X |

FOREIGN PATENTS OR APPLICATIONS 610,488  10/1948  United Kingdom ........... 174/102 D Primary Examiner—Arthur T. Grimley
Attorney, Agent, or Firm—Dennison, Dennison, Meserole & Pollack

[57] ABSTRACT

A longitudinal sealant barrier for cables carrying electrical energy which barrier is situated between a metal screen and a semiconductor layer covering the insulation of the metal core of the cable. It comprises a continuous or discontinuous layer arranged on the internal surface of the screen of a thermofusible mixture and a succession of rings of the same mixture, each ring being optionally provided on the side of the layer with a layer of a cellulose derivative.

8 Claims, 3 Drawing Figures

SEALANT BARRIER FOR ELECTRICAL CABLES

The invention relates broadly to the field of electrical cables, and more specifically a longtiudinal impervious sealant barrier for cable carrying electrical energy.

Such an electrical cable comprises, starting from its axis and proceeding radially towards the exterior, a core consisting of one or more metal conductors of copper, aluminum or one of its alloys, a first semiconducting layer, an insulating layer whose thickness depends on the voltage of the current carried, a second semiconducting layer, a longitudinal sealant barrier, a semiconductor anticorrosion varnish layer, a metal screen of copper, aluminum or one of its alloys, a layer of an adherent varnish, and finally an external insulating sheath.

The longitudinal sealant barrier is intended to prevent any moisture which may have penetrated from spreading along the cable. It should not interpose a continuous, electrically insulating layer between the screen and the second semiconductor layer; it should prevent water from spreading along the cable and should not cause any separation of the second semiconductor layer from the insulation.

The object of the invention is to provide a longitudinal sealant barrier for cables carrying electrical energy, which satisfies these requirements.

The sealant barrier according to the invention is arranged between a metal screen and a semiconductor layer covering the insulation for the metal core of the cable. It comprises a layer of a thermofusible mixture previously deposited on the internal surface of the metal screen, and a succession of rings of the same thermofusible mixture.

An improved variant of the barrier according to the invention comprises a layer of a cellulose derivative such as carboxymethylcellulose deposited on each of the rings of thermofusible material and on the side of the semiconducting layer covering the insulation of the cable core.

The invention thus defined is explained by means of an example illustrated by the accompanying drawings.

In these figures the same elements are represented by the same reference numerals.

Figure 1:
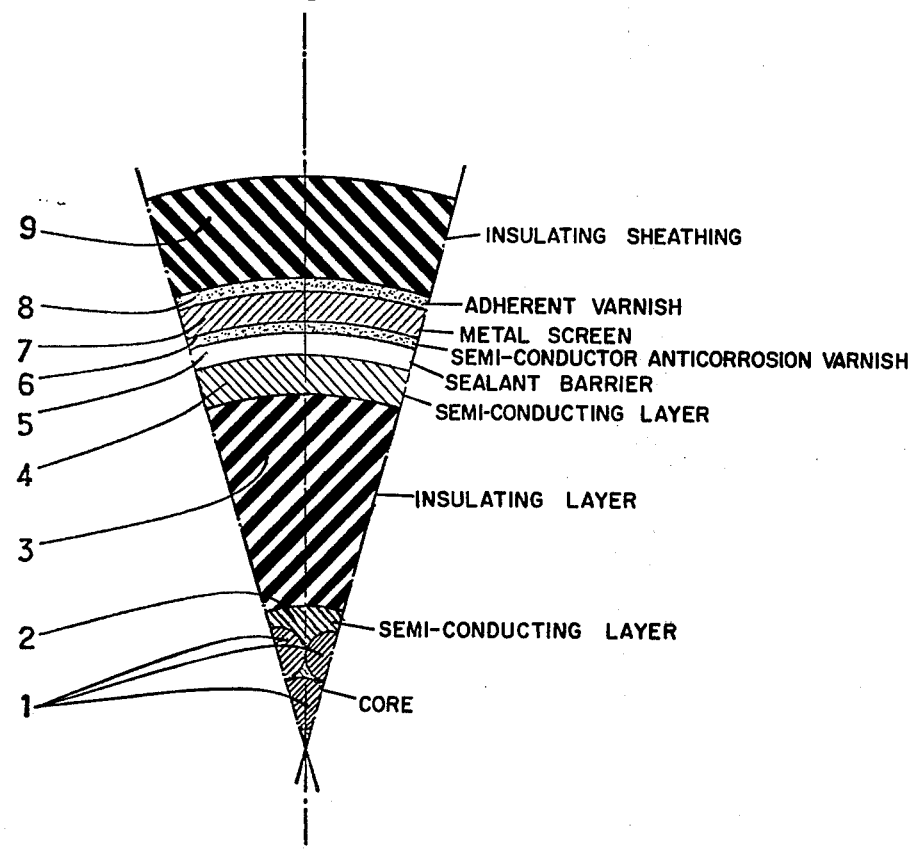
FIG. 1 is a section along a plane perpendicular to the axis of a cable for carrying electrical energy. So as not to complicate the drawing, only a sector of the cable is shown.

The cable shown in FIG. 1 comprises, staring from its axis and working to the exterior, a core 1 consisting of a plurality of metal filaments in the example shown, a first semiconducting layer 2, and insulating layer 3, a second semiconducting layer 4, a longitudinal sealant barrier 5, a layer of a semiconductor anticorrosion varnish 6, the presence of which is not absolutely essential for carrying out the invention, a metal screen 7, a layer 8 of an adherent varnish and, finally, an external insulating sheath 9.

The core 1 which may of course comprise only a single conductor is of a good electrically conducting metal such as copper, aluminum or an alloy containing a small proportion of the latter metal. In the example described, the insulating layer 3 consists of chemically cross-linked polyethylene. The metal screen 7 consists, like the core, of a good electrically conducting metal. The external sheath 9 is of polyvinyl chloride.

The role of the two semiconducting layers 2 and 4 is to even out the electrical fields. In use, they should never be separated from the insulating layer 3 situated between them. They are, however, removable and can be peeled off so as to facilitate stripping of the core 1 during connection of the cable.

This description of one example of cable is given solely in order to place the longitudinal sealant barrier in perspective. The invention concerns only the barrier and applies to any cable having such a barrier.

The longitudinal sealant barrier 5 consists of a continuous or discontinuous layer 10 of a thermofusible mixture previously applied to the internal surface of the metal screen 7 and of a succession of rings 11 of the same thermofusible mixture deposited on the layer 10. These two elements may be deposited either successively or in a single operation. The width of the rings may be between a few centimeters and several meters.

In the case where the layer 10 is discontinuous, it is in the form of rings arranged in the same plane perpendicular to the axis of the cable as the rings 11.

The thermofusible mixture preferably has a very high viscosity, for example 20,000 centipoises at 150° C, and it may be a semiconductor.

A composition found to be effective is the following: (percentages given by weight) 40 to 70% of a copolymer of ethylene and vinyl acetate; 15 to 30% of hydrogenated collophane derivatives, in particular esters; 5 to 20% of collophane resin and synthetic resin; and up to 40% of graphite.

The semiconductor anticorrosion varnish is of any known type, and a typical composition example is the following: 40% of solvent type varnish; 15% of vinyl copolymers; 20% of hydroxylated polyether or polyester; 2 to 5% of zinc oxychromate; 10% of graphite; 10% of aluminum powder. Twenty percent of aromatic and aliphatic polyisocyanates are added to 100 g of this mixture.

Figure 2:
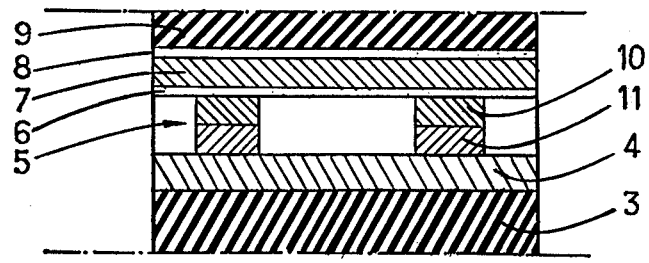
FIG. 2 is a section of the sealant barrier along a plane passing through the axis of the cable.
Figure 3:
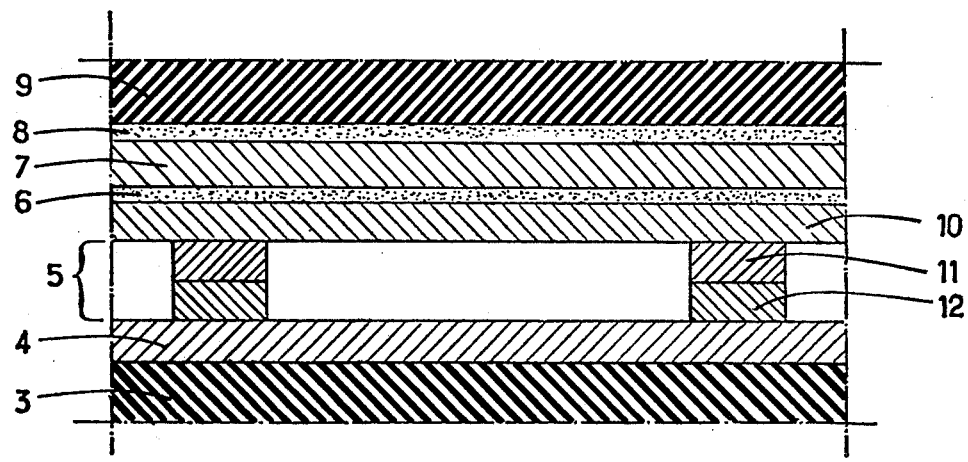
FIG. 3 is a section of a variant of improved sealant barrier, the section being along a plane passing through the axis of the cable.

In the variant of current carrying cable with improved sealant barrier shown in FIG. 3, the layer 10 of the thermofusible mixture is a continuous layer. However, it may also be discontinuous as shown in FIG. 2.

In order to improve the chances of preventing penetration by moisture or water, a layer 12 of a substance such as carboxymethylcellulose may be applied to each of the rings 11. Bearing in mind the marked temperature variations to which the cable may be subject and which will produce changes in its dimensions, it is important to use a product which undergoes marked expansion in the presence of water, which is the case with cellulose products. It should be noted that when cellulose products are used, the thermofusible mixture may or may not contain graphite.

I claim:

1. In an electrical cable having a metal core, an insulation covering the core, a semiconductive layer over the insulation covering and a metal screen, the improvement comprising a longitudinal sealant barrier between said screen and said semiconductive layer, said barrier comprising a layer of a thermofusible mixture coated on the inner surface of said screen and a plurality of spaced rings formed of the same material between said coating and said semiconductive layer.

2. A sealant barrier according to claim 1 wherein said layer of a thermofusible mixture is continuous.

3. A sealant barrier according to claim 1, wherein said layer of a thermofusible mixture is discontinuous and is in the form of a plurality of rings situated in the same plane perpendicular to the axis of the cable as the first mentioned rings.

4. A sealant barrier according to claim 1 wherein the thermofusible mixture is semiconducting and has a high viscosity of the order of 20,000 centipoise at 150° C.

5. A sealant barrier according to claim 4 wherein the thermofusible mixture forming the first mentioned rings comprises by weight 40 to 70% of a copolymer of ethylene and vinyl acetate, 15 to 20% of hydrogenated collophane resin, and 5 to 20% of collophane resin and synthetic hydrocarbon.

6. A sealant barrier according to claim 4 wherein said thermofusible mixture comprises by weight 40 to 70% of a copolymer of ethylene and vinyl acetate, 15 to 30% of hydrogenated collophane derivatives, in particular esters, 5 to 20% of collophane resin and synthetic hydrocarbon, and up to 40% of graphite.

7. A sealant barrier according to claim 1 wherein said rings are provided with a layer of a substance on the side of the semiconducting layer covering the insulation which expands in the presence of water.

8. A sealant barrier according to claim 7 wherein the said substance forming the layer is carboxymethylcellulose.

* * * * *